Nov. 14, 1939.  H. G. MOJONNIER  2,179,949
LIQUID TREATING PLANT
Filed May 2, 1938   3 Sheets-Sheet 1
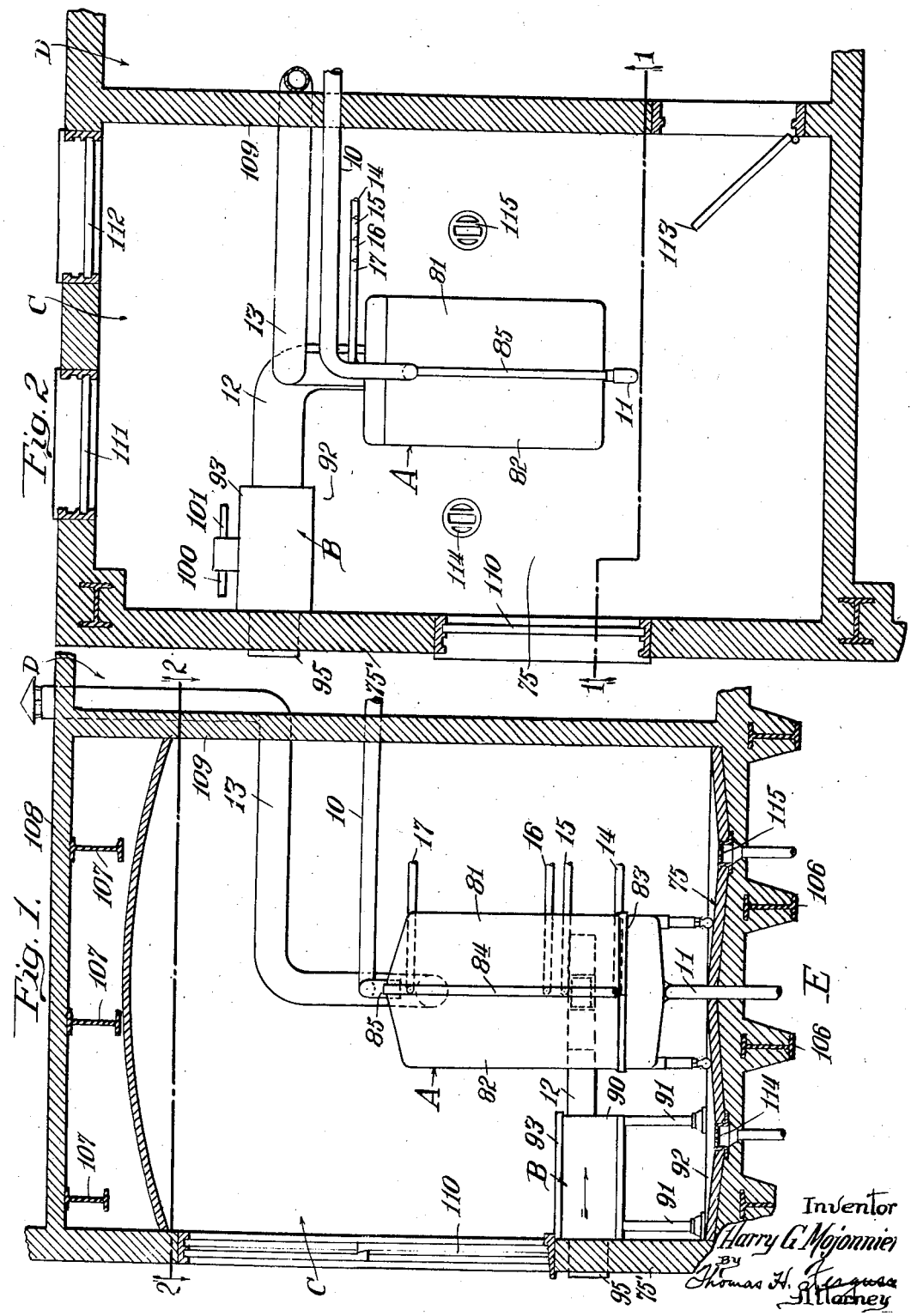

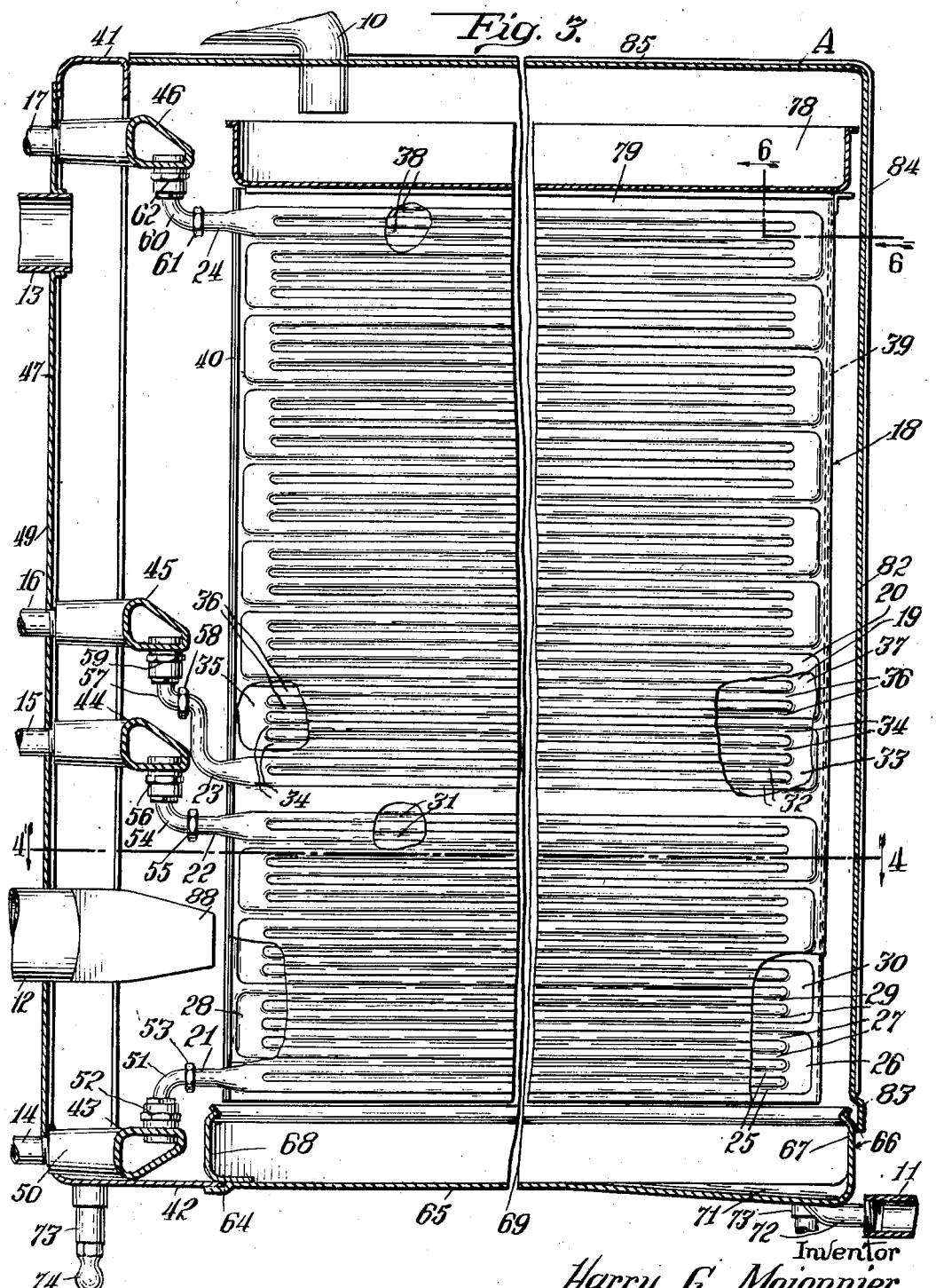

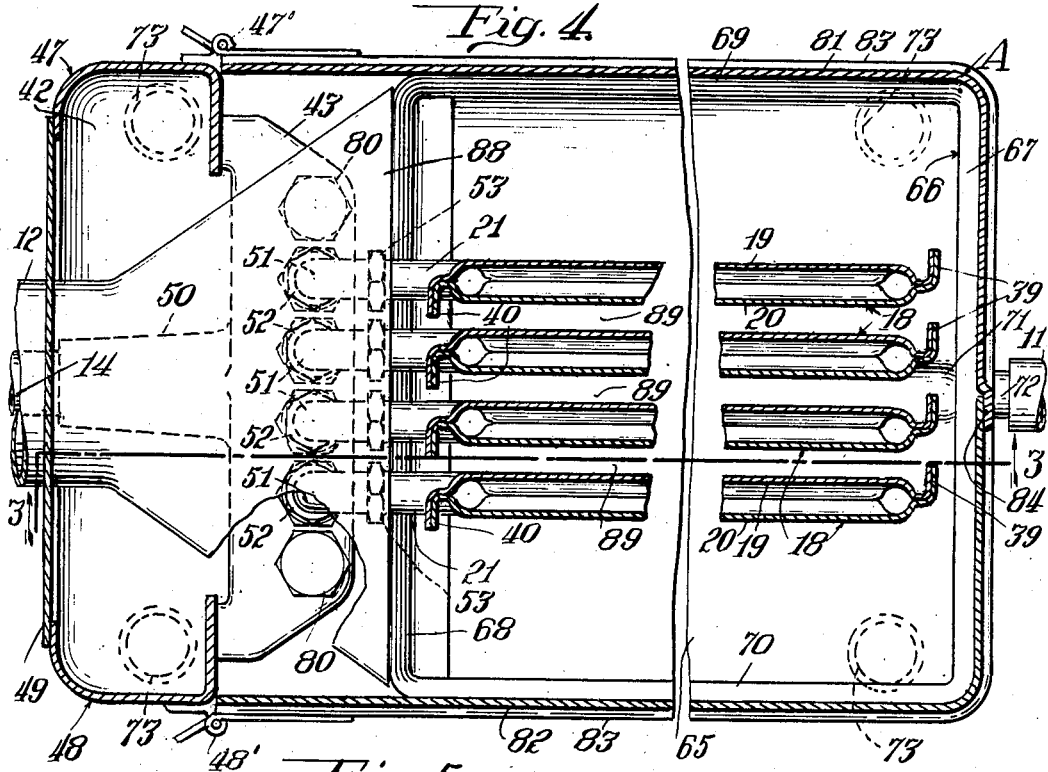

Patented Nov. 14, 1939

2,179,949

UNITED STATES PATENT OFFICE 2,179,949

LIQUID TREATING PLANT

Harry G. Mojonnier, Oak Park, Ill., assignor to Mojonnier Bros. Co., a corporation of Illinois Application May 2, 1938, Serial No. 205,424

5 Claims. (Cl. 257—202)

The present invention relates to liquid treating plants wherein a liquid to be treated is subjected to the action of a heat exchange medium and also to the action of an atmosphere or stream of conditioned air or the like.

In brief, the invention contemplates utilizing a heat exchanger of the surface type and providing for the projection of a stream of conditioned air against and among the heat exchange elements. For efficiency the exchange elements are preferably enclosed. This may be done in different ways. Thus, a preferred way is to employ a support in association with movable covers, the support and covers being arranged to inclose the heat exchange elements and thus provide a tight inclosure into which the air stream is projected.

The invention has been developed in connection with the cooling of wort and accordingly will be described in that connection, although it will be apparent that the invention may be used in the heat exchange treatment of liquids generally, whether to heat them or to cool them, and no matter what the projected fluid stream may be, whether ordinary air, conditioned air, oxygen or another gas, or a mixture of gases.

In connection with the cooling of wort, many breweries have experienced difficulty because of the infection of the wort during the wort cooling operation. This condition is usually more prevalent in the summer months than in the winter months and is invariably traced back to cooler structures which are difficult to keep clean. One object of the present invention is to employ a cooler which can be readily and thoroughly cleaned when necessary and to associate with the same the other parts of the invention in such a way as to preserve this advantage. To this end the cooler elements over which the wort flows are preferably made of stainless steel and the surfaces are polished and thus the possibility of infection is greatly reduced. Air inlets and outlets are structurally quite apart from the cooler surfaces which have to be cleaned, and so do not interfere with that operation.

Another object of the invention is to produce a wort cooler, or like, plant which will occupy a minimum floor space. This result is obtained particularly by employing a compact cooler. With this in use the air and other connections may be made without materially increasing the floor space required. In the preferred embodiment, the cooling elements lie close together when in service and are closely encased within tight fitting covers. The result is a tight fitting cabinet or housing into which the air or gas, preferably conditioned for the service, may be projected.

By reason of the close fit of the covers and casing, which constitute the housing, it is possible to control with nicety the condition of the air, gas or other fluid which is projected into the inclosure wherein the cooling elements are located. In the preferred construction, air is cleaned and heated to a suitable temperature and then forced into the interior of the housing. Preferably the air conditioning unit is located outside of the housing, is small and is readily accessible at all times for cleaning and repairs.

The projection of a stream of air through the interior of the cooler results in carrying away spent air and vapors. Consequently, at all times the liquid being treated in the cooler is subjected to a stream or current of air or other fluid in proper condition for the service to be rendered.

In service, the cooler elements may be supplied with one or more suitable cooling mediums. In the form illustrated, there are two sections or zones in each element, and connections may be provided for supplying the different zones as desired. Thus a point of flexibility is obtained which is desirable.

All these and other features and advantages of the invention will be more fully understood upon reference to the following detailed description, taken in connection with the accompanying drawings, while the scope of the invention will be particularly pointed out in the appended claims.

In said drawings, Fig. 1 is a sectional view taken through a portion of a building, illustrating, in elevation, a liquid treating plant constructed and arranged in accordance with the present invention, the plane of section being indicated by line 1—1 of Fig. 2. Fig. 2 is a horizontal section through the same portion of the building, illustrating the liquid treating plant in plan, the plane of section in this view being indicated by the line 2—2 of Fig. 1. Fig. 3 is a partial sectional view of a heat exchanger such as is suited to the practice of the invention, the plane of section being indicated by the line 3—3 of Fig. 4. Fig. 4 is a horizontal section of the same structure, the plane of section being indicated by the line 4—4 of Fig. 3. Fig. 5 is a plan view of an air conditioner suited to the practice of the present invention, the greater portion of the casing being shown in section. And Fig. 6 is a detailed sectional view of a portion of the bottom of a distributor located above the heat exchange elements, showing particularly how the distributor is carried upon the elements, and the manner in which the liquid to be treated is delivered to the elements. Throughout these views like characters refer to like parts.

In the embodiment illustrated, the apparatus employed in carrying out the invention includes a heat exchanger A and fluid conditioner B, both preferably located in the same room C of a suitable building. The liquid to be treated is supplied to the heat exchanger A through the feed pipe 10 which may lead from another room D. After treatment, this liquid is conducted from the exchanger A through a suitable discharge pipe 11 which leads, in the embodiment illustrated, to room E below the room C. From the conditioner B the fluid which is used passes through a supply conduit 12 into the interior of the closed exchanger and after circulating therein escapes to atmosphere through an outlet pipe 13 which preferably passes to a point above all the rooms of the structure employed in this service. The heat exchanger elements, in this instance, each have two zones. The connections for the lower zones are inlet pipe 14 and outlet pipe 15. The corresponding connections for the upper zones are inlet pipe 16 and outlet pipe 17.

Put in terms of wort treatment, the wort enters the cooler A by passing through pipe 10, and after being cooled passes from the cooler through pipe 11. The conditioner B treats air, preferably outside air, by filtering and heating it, and then passes it through conduit 12 into the interior of the cooler A, and thence on out through pipe 13. Thus, the wort is subjected to a flow of clean heated air, and the circulation of the air among the exchange elements carries off the spent air and vapors which arise from the cooling of the wort.

With this general view of the structure in mind, the various parts may be more fully considered. Thus, the cooler A is quite similar in construction to that disclosed in United States Patent No. 2,040,947, dated May 19, 1936, differing principally in employing hollow hinges instead of solid hinges and hose connections. The several elements 18, of which four are shown, are made up in the manner pointed out in the aforesaid patent and comprise in each instance oppositely stamped sheet metal members 19 and 20 which are secured together at their edges and intervening points by welding. In the present instance, each element is provided with two inlets and two outlets. The lowermost inlet 21 cooperates with outlet 22 to provide a passage for the heat exchange medium through the lower zone of heating channels. In like manner, inlet 23 and outlet 24 cooperate in providing for the passage of the same or a different medium through the upper zone of channels.

The medium which enters inlet 21 will pass through parallel channels 25 to an end channel 26 and then back through parallel channels 27 to an end channel 28, and thence through parallel channels 29 to end channel 30, and so on, back and forth, until the uppermost of this set of channels is reached, whereupon the path will extend through channels 31 to the outlet 22.

In a similar way, the path from inlet 23 will extend through parallel channels 32 to end channel 33, thence back through parallel channels 34 to end channel 35, and thence through parallel channels 36 to end channel 37, and so on, back and forth, until finally the path will extend through parallel channels 38 at the top of the zone, to the outlet 24.

At the forward edge of each element 18, the constituent plates are bent at right angles to the plane of the element so as to provide strengthening flanges 39 and 40.

The inlets and outlets 21, 22, 23, 24 provided on each of the elements 18 are associated respectively with inlet and outlet manifolds 43, 44, 45 and 46. These manifolds are positioned at suitable elevations for cooperation with the element inlets and outlets and they are supported upon two vertical channel frame members 47, 48. A plate 49 extends across the back of the structure and is secured by welding or otherwise at its edges to the adjacent flanges of the members 47 and 48. Likewise a frame member 41 unites the upper ends of the uprights 47 and 48. Similarly, a bottom plate 42 extends between the lower ends of these uprights. The channels 47 and 48, the back plate 49, the upper member 41 and the bottom plate 42 form the fixed portion of the housing or casing of the exchanger. The ends of each manifold are connected to the adjacent flanges of the uprights 47 and 48 in any suitable way, as by welding. As clearly shown in Fig. 4, the lowermost manifold 43 has a central tubular portion 50 into which the associated inlet pipe 14 is threaded. Thus, communication is established between the interior of the pipe 14 and the interior of the manifold 43. The other manifolds 44, 45 and 46 are similar to the manifold 43 and have tubular central portions into which the associated pipes 15, 16 and 17 are threaded, thus providing communication between the interiors of those pipes and the associated manifolds.

As clearly shown, the inlet 21 of each element is connected to an elbow 51 which is secured at its lower end to the flat face of the manifold 43 by a suitable stuffing box 52. With this construction there is direct communication with the interior of the manifold 43 and the inlet 21 of the associated element. A union nut 53 serves to connect the inlet pipe 21 and the elbow 51. Whenever it is necessary to disconnect the element at this point, the union nut 53 may be removed. This will allow separation of the pipe 21 and the elbow 51. Similarly, the outlet pipe 22 is communicatingly connected with an elbow 54 by means of a union nut 55, and the elbow is in turn similarly connected with the flat face of the manifold 44, through the agency of a stuffing box 56. Again, by removing the union nut 55, the pipe 22 and the elbow 54 may be separated. In the case of inlet 23, said inlet is in the form of a pipe which extends upward so as to clear the manifold 44. The upper end of the pipe 23 is connected to an elbow 57 by a union nut 58 and the elbow is in turn connected through the flat face of the associated manifold 45, through the agency of a stuffing box 59. By removing the union nut 58, the pipe 23 may be separated from the elbow 57. Again, in the case of the outlet 24, there is an elbow 60, a union nut 61, and a stuffing box 62 similarly related to the associated manifold 46.

What has been stated with reference to the pipe connections 21, 22, 23 and 24 applies in the case of each of the elements 18. As clearly shown, in the case of manifold 43 and its connections, the various stuffing boxes 52 are located side by side, and thus the elements 18 may be brought into close substantially parallel relation when in service. On the other hand, when it is desired to clean them, each may be moved about its axis of rotation, which axis extends through the centers of the associated stuffing boxes 52, 56, 59 and 62. In other words, each element is provided with a series of hollow hinges and the elements may be separated a considerable distance apart, far enough, indeed, so that an attendant may get in between the elements and thoroughly clean them by scrubbing, or otherwise as may be necessary.

At the bottom of the channels 47 and 48, which form part of the frame or housing structure, and extending forward from the forward edge of the bottom plate 42, there is a second plate 65. The two plates 42 and 65 lie in substantially the same horizontal plane and are suitably secured together, as by welding, as indicated at 64 in Fig. 3. The plate 65 forms the bottom of a receiver 66 into which the wort, or other liquid being treated, will pass after leaving the cooling elements 18 over which it has flowed. Besides the bottom 65, the receiver 66 includes front and rear walls 67 and 68 respectively, and side walls 69 and 70. The latter extend back into engagement with the lower ends of the channels 47 and 48 and are suitably secured thereto by welding or otherwise. Indeed, all the walls of this receiver are preferably welded at their joints. Toward the forward end of the bottom 65 of the receiver 66 is a depressed portion or channel 71 which leads to an outlet pipe 72 which in service is connected to the delivery pipe 11 through which the treated liquid passes from the exchanger. The receiver and associated housing structure is supported upon four legs 73 having ball feet 74. The latter rest upon the floor 75 of the room C in which the exchanger is located.

In order to receive the wort at the upper end of the elements 18, a receiver 78 is provided. This receiver is similar in construction to that illustrated in the aforesaid Patent No. 2,040,947, and has an irregular bottom provided with formed grooves into which the upper edges 79 of the elements 18 project. These elements form the sole support of the distributor 78. When it is desired to clean the elements 18, the distributor 78 is removed. In restoring it to operating position, the fins 79 at the upper edges of the exchange elements engage respectively within the grooves formed in the bottom of the receiver. The supply pipe 10, by which the wort or other liquid to be treated is supplied, opens at its delivery end into the receiver 78. As the liquid passes from pipe 10 into the receiver 78, it is distributed evenly over the surfaces of the various cooling elements 18 and after being subjected to the cooling action of the mediums passing through the interiors of these elements, it is collected in the receiver 66 and passes therefrom into the outlet pipe 11.

In heat exchangers of the kind illustrated, different mediums may be employed where there is an arrangement of cooling passages in different zones, as in the illustrated case. Ordinarily, where wort is to be treated, the medium which passes through inlet pipe 16 into the manifold 45 and thence through the upper zones of the several cooling elements in parallel, and out again through manifold 46 and outlet pipe 17, is ordinary water such as is commonly supplied through the mains of a city water system. On the other hand, the medium which enters through pipe 14 and manifold 43 and passes through the channels of the lower zones of the several elements, and out again through manifold 44 and pipe 15, may be chilled water, or it may be ammonia or other refrigerant. In certain installations, the upper zones have been supplied with ordinary city water and the lower zones have been supplied with ammonia furnished by a refrigerating cycle.

As clearly illustrated in Fig. 4, the manifolds may be arranged for the ready addition of elements 18. Although, as there shown, there are but four elements, it will be noted that the manifold 43 is provided with two additional openings closed by caps 80. By removing these caps and similar caps in the other manifolds 44, 45 and 46 it is obvious that two more elements 18 might be easily added to the structure.

In order to complete the inclosure for the several elements 18, when in operative position, two covers 81 and 82 are provided. These are similar in arrangement and mounting to the covers shown in the aforesaid Patent No. 2,040,947. Both covers have flanges 83 at their lower edges whereby they are made to fit snugly against the outer surfaces of the upper portions of the liquid receiver 66. These covers have offset portions which extend above and in front of the elements 18 to enclose them whenever the parts are in operative position. As clearly shown, the vertical front portions and the horizontal top portions of the two covers meet along a vertical plane. Along their meeting edges the cover 81 is provided with a flange which overlaps the adjacent edge of the cover 82. The vertical portion of this flange is designated 84 and the horizontal portion 85. Thus when the covers are tight together a continuous flange on the one overlaps the abutting edge of the other. By having the two covers meet in this way it is possible to extend the liquid supply pipe 10 down into proximity to the distributor 78 on this medial plane and then provide semi-circular openings for the passage of the pipe 10, said openings being in the edges of the covers and embracing the pipe with a reasonably tight joint. The covers are hinged to the frame members 47 and 48 in any suitable way, as by means of the hinges 47' and 48' respectively, two or more such hinges being provided for each cover, as judgment may dictate.

In addition to the matters heretofore set forth in detail with respect to the heat exchanger, the new structure makes provision for the incoming air supplied by the conditioning device B. As clearly shown, the conduit 12 leads from the conditioner B and passes through a suitable opening in the wall 49 of the casing. Immediately after passing through the wall 49, the shape of the cross section of the conduit 12 is changed so as to provide a wide flat nozzle 88 which is located well toward the lower end of the elements 18. As clearly shown, this nozzle 88 has a limited vertical dimension but an extended dimension in the direction of its width. In other words, it is fan-shaped in outlet, and thereby delivers the air that is passed through it, throughout practically the entire width of the inclosure. This means that air passes from the nozzle 88 into all of the passages 89 which intervene between adjacent elements 18. As we shall see, the air thus supplied is supplied under pressure and consequently the stream of air flows to the front of the several elements 18 through the spaces between them and at the ends of the end elements of the set and thence upward through the same intervening and end spaces until it reaches the top of the housing. When this point is reached the stream of air, having taken up the vapors and gases which should be removed from the exchanger, passes out through the outlet pipe 13 which extends preferably through an opening in the plate 49 and is suitably secured in place as by welding.

When it comes to the matter of conditioning the air which is to be used to clear out the interior of the exchanger A, different forms of equipment may be employed. In the present instance, the conditioner B comprises a rectangular casing 90 which is suitably mounted on legs 91 which rest upon a portion 92 of the floor 75 of the room C. The rectangular casing 90 is provided with a removable cover 93 which is held in place by suitable means such as screws 94. The intake end of the casing 90 is provided with an inlet pipe 95 which may extend as shown through the adjacent wall 75' of the room C and thus be in position to take in air from the outside of the room and preferably from the outside of the building. The outlet end of the casing 90 is in direct communication with the conduit 12 which leads directly to the exchange.

The conditioner B is arranged to filter and heat the incoming air and force it through the conduit 12. In the present instance there are a series of filtering elements 96. These include in each case an outer frame 87 and a web 97, the latter being a web of cloth or other suitable filtering material. The several filtering elements are positioned side by side in the casing 90 at the incoming end of the conditioner. When once positioned, they are held in place by cleats 98 which are secured to the inner walls of the casing 90. The structure is such that, upon removing the cover 93, the filtering elements 96 may be readily removed and new ones put in their places.

After passing through the filtering elements 96, the air passes over a heating coil 99 which is supplied with an intake 100 and an outlet 101. A suitable heating medium may be passed through the coil 99. Steam or hot water may serve the purpose. Obviously, too, the coil 99 may give way to a heating medium of some other construction. After passing over the coil 99, the cleaned and heated air is forced onward through the conduit 12 by an electric fan 102. This fan or blower may be variously constructed. In the present case, it includes blades 103 which act upon the air to advance it, as stated. Suitable electrical conductors 104 and 105 pass out through insulated openings in the case 90, and, by supplying current through these, the motor is properly driven and controlled Obviously, instead of the conditioner B receiving air from outside the room C it might be positioned so as to take up air from the room.

In the present instance, the floor 75 of the room C is carried upon suitable I-beams 106. Similarly, at the top of the room, I-beams 107 support the floor 108 of the room above. Indeed, these beams might be those which support the roof. It is to be noted that the outlet pipe 13 which carries off the vapors and spent air from the exchanger A preferably passes completely outside of the rooms C and D into the open atmosphere as shown in Fig. 1 wherein the pipe passes through an opening in the wall 109 and then up beyond the floor or roof 108 into the space above it, which is, as stated, preferably open to atmosphere. In the case illustrated, the outlet for the wort passes down into the room E below the floor 75. Likewise, the incoming wort passes through pipe 10 which enters the room C by passing through an opening in the wall 109.

It is clear that the way in which the pipes are arranged is a matter of expediency, depending upon the location of the equipment in the particular installation in hand. In the present instance, the room C is properly ventilated, being provided with windows 110, 111, 112, and a door 113. Suitable drains 114 and 115 are provided in the floor 75 which has a proper pitch to carry liquids to the drains. The portion 92 of that part of the floor which lies beneath the conditioner B is more nearly level; it is not pitched like the portions adjacent to the drains 114 and 115.

Obviously, in carrying out the invention, the details of the different instrumentalities may be considerably varied. Likewise, the degree of temperature employed in the conditioning apparatus B and the pressure applied by the fan 102 may be varied. However, in practice satisfactory results have been obtained in an installation similar to that illustrated wherein the conditioned air had a temperature of about 90 degrees Fahrenheit and the pressure applied by the fan was equal to about one-fourth of an inch of water, which means a pressure of about one one-hundredth of a pound per square inch.

In making up the exchanger A and conditioner B and their piping connections, any suitable metals may be employed. Preferably, as before stated, stainless steel will be used for the heat exchange elements. The materials used in the construction of the building are the usual ones.

Since many alterations and modifications may be made in the details of the structures disclosed, without departing from the spirit and scope of the invention, the terms of the appended claims are relied upon to cover those alterations, modifications and uses of the invention which rightly come within its spirit and scope.

I claim:

1. In a device of the class described, a group of relatively flat heat exchange elements arranged side by side in substantially parallel relation, said elements providing narrow intervening spaces, an inlet flue, a relatively wide and shallow nozzle at the outlet end of said inlet flue, the plane of said nozzle extending transversely of the planes of said elements, and the nozzle opening being wide enough to embrace within its discharge area the adjacent edges of all of said elements.

2. In a device of the class described, a group of relatively flat upright exchange elements of the trickle type arranged side by side in substantially parallel relation, said elements providing narrow intervening spaces, an inlet flue, and a nozzle receiving from said flue and discharging into all of said spaces, whereby air or the like is circulated among said elements.

3. In a device of the class described, a casing, a group of vertical exchange elements of the trickle type arranged side by side in substantially parallel relation in said casing, said elements providing narrow intervening spaces, an outlet flue extending outward from an upper part of said casing, an inlet flue entering said casing near its bottom, and a nozzle for said inlet flue operative to direct a scavenging blast into all of said spaces, whereby said blast circulates among said elements and passes out through said outlet flue.

4. A device of the class described comprising a fixed housing portion, movable covers for engaging said portion and cooperating therewith to provide an inclosure, a group of upright heat exchange elements adapted to be arranged side by side in substantially parallel relation in said inclosure, an inlet flue entering said inclosure by passing through a lower portion of said fixed housing portion, a nozzle for said flue operative to direct a blast of scavenging air among said elements when said inclosure is established, to clear the same of gases and the like, and outlet means for conducting the loaded air from the inclosure after it has passed among said elements.

5. A device of the class described comprising a fixed housing portion, movable covers for engaging said portion and cooperating therewith to provide an inclosure, a group of upright heat exchange elements adapted to be arranged side by side in substantially parallel relation in said inclosure, an inlet flue entering said inclosure by passing through a lower portion of said fixed housing portion, a nozzle for said flue operative to direct a blast of scavenging air among said elements when said inclosure is established, and an outlet flue passing from said enclosure through an upper portion of said fixed housing portion and operative to conduct the loaded air from said inclosure.

HARRY G. MOJONNIER.